(12) United States Patent
Albrecht et al.

(10) Patent No.: US 8,177,905 B2
(45) Date of Patent: May 15, 2012

(54) FLUIDISING COMPOSITION

(75) Inventors: Gerhard Albrecht, Tacherting (DE); Max Oppliger, Allschwil (CH); Qiwei Yang, Erlenbach (CH); Hubertus Matthias Zink, Trostberg (DE)

(73) Assignee: Construction Research & Technology GmbH, Trostberg (DE)

( * ) Notice: Subject to any disclaimer, the term of this patent is extended or adjusted under 35 U.S.C. 154(b) by 169 days.

(21) Appl. No.: 12/694,796

(22) Filed: Jan. 27, 2010

(65) Prior Publication Data
US 2010/0130647 A1 May 27, 2010

Related U.S. Application Data

(63) Continuation of application No. 12/040,475, filed on Feb. 29, 2008, which is a continuation of application No. 10/524,466, filed as application No. PCT/EP02/10045 on Sep. 9, 2002, now abandoned.

(51) Int. Cl.
*C04B 24/04* (2006.01)
*C04B 24/12* (2006.01)

(52) U.S. Cl. ........ 106/696; 106/724; 106/727; 106/728; 106/823; 524/5; 524/131; 524/320

(58) Field of Classification Search .................. 106/696, 106/724, 727, 728, 823; 524/5, 131, 320
See application file for complete search history.

(56) References Cited

U.S. PATENT DOCUMENTS

| 3,964,921 | A | | 6/1976 | Persinski et al. | |
|---|---|---|---|---|---|
| 4,040,854 | A | | 8/1977 | Persinski et al. | |
| 4,222,784 | A | * | 9/1980 | Caspar et al. | 106/695 |
| 4,507,154 | A | * | 3/1985 | Burge et al. | 106/728 |
| 5,369,198 | A | * | 11/1994 | Albrecht et al. | 526/240 |
| 5,389,144 | A | * | 2/1995 | Burge et al. | 106/737 |
| 5,413,819 | A | | 5/1995 | Drs | |
| 5,567,236 | A | * | 10/1996 | Schapira et al. | 106/728 |
| 6,767,164 | B2 | * | 7/2004 | Shimizu et al. | 405/150.2 |

FOREIGN PATENT DOCUMENTS

| CH | 678526 A5 | 9/1991 |
|---|---|---|
| EP | 0 508 158 A2 | 10/1992 |
| EP | 0 508 158 B1 | 4/1996 |
| GB | 2 347 415 A | 9/2000 |
| WO | WO 00/77058 A | 12/2000 |

* cited by examiner

*Primary Examiner* — Paul Marcantoni
(74) *Attorney, Agent, or Firm* — Curatolo Sidoti Co., LPA; Salvatore A. Sidoti; Vincent A. Cortese

(57) ABSTRACT

A fluidizing admixture for use with sprayable cementitious compostions, the admixture consists of 2-phosphonobutane-1,2,4-tricarboxylic acid and at least one selected polymer derived from ethylenically-unsaturated mono- or dicarboxylic acids. Citric acid may optionally be present. The admixture has good fluidizing properties and outstanding shelf-life.

14 Claims, No Drawings

FLUIDISING COMPOSITION

CROSS REFERENCE TO RELATED APPLICATIONS

This application is a continuation of U.S. Ser. No. 12/040,475, filed on Feb. 29, 2008 which is a continuation of U.S. Ser. No. 10/524,466, filed on Nov. 14, 2005, now abandoned, which is a national stage application under 35 U.S.C. §371 of International Application No. PCT/EP2002/010045, filed Sep. 9, 2002, from which application priority is claimed.

This invention relates to the spraying of cementitious compositions and to admixtures for use in such spraying.

The spraying of cementitious compositions such as concrete is regularly used in a number of applications, most notably in tunnelling. It is a requirement that such compositions be able to be easily conveyed (usually by pumping) to a spray nozzle. This can be achieved by the addition to the cementitious composition that is to be pumped and sprayed, at the mix stage, of an admixture which confers improved fluidity of the mix. There is a considerable variety of such admixtures known to and used by the art.

It has now been found that an especially effective admixture may be prepared by the combination of particular selected components. The invention therefore provides a fluidising admixture for use with sprayable cementitious compostions, the admixture consisting of
  (1) 2-phosphonobutane-1,2,4-tricarboxylic acid;
  (2) optionally, citric acid; and
  (3) at least one polymer derived from ethylenically-unsaturated mono- or dicarboxylic acids, and characterised in that the polymer consists of
  a) 51-95 mole % of moieties of formula 1a and/or 1b and/or 1c $$—CH_2—CR^1— \atop |\phantom{—CH_2—}COX} \quad \text{Ia}$$

$$—CH_2—C—CH_2—CH_2—COX \atop |\phantom{—CH_2—}COX \atop |\phantom{—CH_2—}CH_2 \atop |\phantom{—CH_2—}COX} \quad \text{Ib}$$

$$—CH_2—C—CH_2— \atop |\phantom{—CH_2}\phantom{—}| \atop O=C\phantom{—}C=O \atop \phantom{O=C—}Y} \quad \text{Ic}$$

wherein
  $R^1$=hydrogen or a $C_{1-20}$ aliphatic hydrocarbon residue;
  $X=O_aM$, $—O—(C_mH_{2m}O)_n—R^2$, $—NH—(C_mH_{2m}O)_n—R^2$,
  M=hydrogen, a mono- or divalent metal cation, an ammonium ion or an organic amine residue;
  a=0.5 or 1;
  $R^2$=hydrogen, $C_{1-20}$ aliphatic hydrocarbon, $C_{5-8}$ cycloaliphatic hydrocarbon or optionally substituted $C_{6-14}$ aryl residue;
  $Y=O$, $NR^2$;
  m=2-4; and
  n=0-200 b) 1-48.9 mole % of moieties of the general formula II $$—CH_2—CR^3— \atop |\phantom{—CH_2—}(CH_2)_p—O—(C_mH_{2m}O)_n—R^2} \quad \text{II}$$

wherein
  $R^3$=hydrogen or $C_{1-5}$ aliphatic hydrocarbon;
  p=0-3; and
  $R^2$ has the meaning given previously;
c) 0.1-5 mole % of moieties of Formulae IIIa or IIIb $$—CH—C— \atop |\phantom{—}\phantom{—}| \atop S\phantom{—}T \atop \phantom{—}R^4} \quad \text{IIIa}$$

$$—CH—CH—\phantom{XX}—CH—CH— \atop |\phantom{—}R^2\phantom{—}|\phantom{XXX}|\phantom{—}R^2\phantom{—}| \atop (CH_2)_z\phantom{—}—V—\phantom{—}(CH_2)_z} \quad \text{IIIb}$$

wherein
  S=H, $—COO_aM$, $—COOR^5$ $$T = U^1—(CH—CH_2—O)_x—(CH_2—CH_2O)_yR^6 \atop \phantom{T = U^1—}| \atop \phantom{T = U^1—}CH^3$$

$—W—R^7$
  $—CO—[NH—(CH_2)_3]_5—W—R^7$
  $—CO—O—(CH_2)_z—W—R^7$
  $—(CH_2)_z—V—(CH_2)_z—CH=CH—R^2$
  $—COOR^5$ when S is $—COOR^5$ or $COO_aM$
  $U^1=—CO—NH—$, $—O—$, $—CH_2O—$
  $U^2=—NH—CO—$, $—O—$, $—OCH_2—$
  $V=—O—CO—C_6H_4—CO—O—$ or $—W—$ $$W = \left( \begin{array}{c} CH_3 \\ | \\ Si—O \\ | \\ CH_3 \end{array} \right)_r \begin{array}{c} CH_3 \\ | \\ Si— \\ | \\ CH_3 \end{array}$$

$R^4$=H, $CH_3$
$R^5$=H, $C_{3-20}$ aliphatic hydrocarbon residue, $C_5$-$C_8$ cycloaliphatic hydrocarbon residue or $C_{6-14}$ aryl residue;

$$R^6 = R^2, \quad —CH_2—CH—U^2—C=CH \atop \phantom{R^6 = R^2,}| \phantom{XX} | \atop \phantom{R^6 = R^2,}R^4 \phantom{X} R^4 \phantom{X} S$$

$$R^7 = R^2, \quad —[(CH_2)_3—NH]_s—CO—C=CH \atop \phantom{R^7 = R^2,XXXXXXXXXXXX}| \phantom{X}| \atop \phantom{R^7 = R^2,XXXXXXXXXXXX}R^4 \phantom{X} S$$

$$—(CH_2)_z—O—CO—C=CH \atop \phantom{—(CH_2)_z—O—CO—}| \phantom{X}| \atop \phantom{—(CH_2)_z—O—CO—}R^4 \phantom{X} S$$

wherein
  r=2-100
  s=1, 2
  x=1-150 y=0-15
z=0-4
d) 0-47.9 mole % of moieties of the general formula IVa and/or IVb:

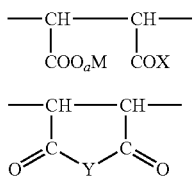

wherein a, M, X and Y have the significances hereinabove defined.

In a preferred embodiment of the invention, the polymer is characterised as follows—any moiety or group present in the polymer description hereinabove and not specifically mentioned in the following embodiment is absent from the embodiment, and any numerical value not specifically mentioned remains unaltered from that of the polymer description hereinabove;
a) the moiety is according to formula Ia;
   $R^1$, $R^2$ are independently H or $CH_3$;
   $X=O_aM$, $-O-(C_mH_{2m}O)_n-R^2$
   M=H or a mono- or divalent metal cation;
   a=1;
   $Y=O$, $NR^2$;
   m=2-3; and
   n=20-150;
b) $R^2$, $R^3$ are independently H or $CH_3$; and
   p=0-1;
c) the moiety is according to formula IIIa;
   S=H, $-COO_aM$, $-COOR^5$

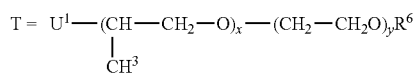

—CO—[NH—$(CH_2)_3]_s$—W—$R^7$
   —CO—O—$(CH_2)_z$—W—$R^7$
   $R^4$, $R^5$ are independently H, $CH_3$;

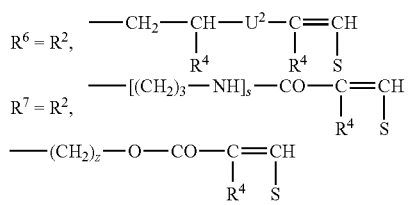

wherein

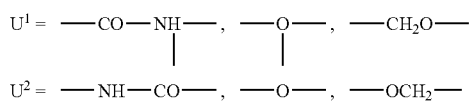

x=20-50;
y=1-10; and
z=0-2.

In a further preferred embodiment, the polymer is characterised as follows—any moiety or group present in the description of the preferred embodiment hereinabove and not specifically mentioned in the following further preferred embodiment is absent from the further preferred embodiment, and any numerical value not specifically mentioned remains unaltered from that of the preferred embodiment description hereinabove;
a) the moiety is according to formula Ia;
   $R^1$=H;
   $R^2$=$CH_3$.
   $X=O_aM$;
   M=a mono- or divalent metal cation;
   $Y=O$, $NR^2$;
   m=2; and
   n=25-50;
b) $R^2$, $R^3$=H; and
   p=0;
c) the moiety is according to formula IIIa;
   S=H, $-COO_aM$;

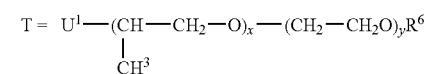

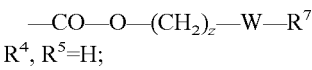
$R^4$, $R^5$=H;

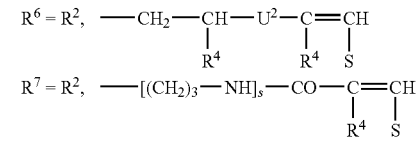

wherein
   $U^1$=—CO—NH—;
   $U^2$=—NH—CO—, —O—, —$OCH_2$—
   x=20-50;
   y=5-10; and
   z=1-2.

The polymers for use in this invention preferably have a weight-average molecular weight of from 5000-50000, preferably from 10000-40000.

Typical examples of preferred polymers may be prepared by the reaction of methoxypolyethyleneglycol-monovinyl ether, maleic anhydride, amine-terminated ethylene oxide-propylene oxide block copolymer and acrylic acid. Examples of these materials and their preparation may be found in International Application WO 00/77058 the contents of which are incorporated herein by reference.

The invention also provides a method of imparting flow to a cementitious composition, comprising the addition thereto of an admixture as hereinabove described.

The invention also provides a method of spraying a cementitious composition by preparing a cementitious mix and conveying the mix to a spray nozzle, there being added to the mix at preparation an admixture as hereinabove described.

The proportions of the solids of the three components in the admixture are as follows:

|  | limits | more preferred | most preferred |
|---|---|---|---|
| Component 1 | 1-40 | 2-20 | 4-12 |
| Component 2 | 0-40 | 2-20 | 4-12 |
| Component 3 | 5-60 | 10-40 | 20-30 |

The admixture will always contain a proportion of water, and the admixture will never be 100% solids, as the "limits" and "more preferred" columns would seem to suggest is possible. However, the skilled person will be able to determine appropriate compositions in each case, by simple experimentation.

The admixture is added to a cementitious mixture at a rate of from 0.2-2.0%, preferably from 0.5-0.8% by weight solids on cement.

The admixture according to this invention may be used in conjunction with all the conventional admixtures used in the spraying of cementitious compositions, for example, the various accelerators commonly added at the spray nozzle. The admixture according to the invention works well with both the classic alkali types (such as aluminates, caustic alkalis and "water glass") and the newer alkali-free, generally aluminium compound-based types.

The admixture according to the invention performs at least as well as known fluidity-improving admixtures. It has the additional major practical advantage of having a very long shelf life. This means that it can be prepared well in advance of use and stored for several months without any segregation of ingredients. Moreover, it maintains this stability in the adverse conditions often found in tunnels, such as high temperatures, on exposure to which many conventional admixtures are no longer stable.

The invention is further described with reference to the following examples.

EXAMPLE 1

Preparation and Testing of an Admixture According to the Invention

An admixture is prepared by mixing the following components

| polymer (44% aqueous solution)[1] | 50 parts by weight |
|---|---|
| water | 36 parts |
| 2-phosphonobutane-1,2,4-tricarboxylic acid (50% aqueous solution) | 7.8 parts |
| citric acid monohydrate | 7.1 parts |

[1]The material used is "MVA 2453 L/44%" ex Degussa.

This is added to a concrete mix of the following composition at a rate of 0.7% solids on cement:

| Portland cement CEM I 42.5 | 450 kg/m$^3$ |
|---|---|
| Aggregate 0-4 mm | 1165 kg/m$^3$ |
| 4-8 mm | 500 kg/m$^3$ | having a water/cement ratio of 0.435.

As a comparison, there is added to samples of the same concrete mix the same proportion of a high performance, commercially-available fluidising agent GLENIUM® T 803 ex MBT (Schweiz) AG. These mixes are tested by means of (a) a flow table, and (b) spraying.

The flow table tests are as follows:

|  |  | Composition of invention | GLENIUM T 803 |
|---|---|---|---|
| Water/cement ratio |  | 0.435 | 0.441 |
| Flow table spread | [cm] |  |  |
| 1 h |  | 52 | 54 |
| 2 h |  | 50 | 52 |
| 3 h |  | 47 | 49 |
| 4 h |  | 45 | 47 |
| Air content | [%] | 3.0 | 2.6 |

For the spray testing, there is added at the nozzle in both cases 7% by weight on cement of a commercially-available shotcrete accelerator, MEYCO® SA160 (ex MBT (Schweiz) AG. The compressive strength is measured in a variety of ways and over different times and the results are shown in the following table:

| Compressive. Strength | [MPa] | Composition of invention | GLENIUM T 803 |
|---|---|---|---|
| 3 min. (penetroneedle)[2] |  | 0.12 | 0.06 |
| 6 min. (penetroneedle) |  | 0.18 | 0.09 |
| 15 min. (penetroneedle) |  | 0.19 | 0.20 |
| 30 min. (penetroneedle) |  | 0.36 | 0.27 |
| 1 h (penetroneedle) |  | 0.56 | 0.46 |
| 2 h (penetroneedle) |  | 0.90 | 0.68 |
| 4 h (penetroneedle) |  | 2.70* | 0.90 |
| 1 d (nail gun)[3] |  | 17.5 | 17.1 |
| 28 d (core)[4] |  | 41.7 | 45.8 |

[2]A method for testing compressive strength, in which a metal needle is pushed into concrete and the resistance to its entry is measured. Suitable for relatively soft materials.
[3]A method for testing compressive strength, in which a metal nail is fired into a concrete and its penetration measured. Suitable for concretes at a later stage after setting.
[4]A method for testing compressive strength, in which a cylindrical core is drilled from a hardened concrete and tested on a testing apparatus.
*This result had to be obtained by means of a nail gun, because the concrete is already too hard to use the penetroneedle method. On the other hand, the comparative example is too soft to allow use of the nail gun. This is an indication of the superior early strength development of a concrete utilising the admixture of the present invention. Early strength development is very important in spraying concrete applications.

The admixture according to the invention has performance characteristics comparable with those of the high performance commercial material.

EXAMPLE 2

Stability Testing of the Admixture of Example 1

Samples of the admixture are tested in a mortar by flow table and for setting time. The mortar is a 1:3 blend of CEM I 42.5 Portland cement and CEM standard sand (according to DIN EN 196-1), and the admixture samples are added at a rate of 1% solids by weight on cement. Samples are also stored at 20° C., 30° C. and 40° C. for six months. At the end of the six months, the admixtures remained visually unaffected. The actual test results are shown in the following table:

|  |  | Sample No. | | | |
|---|---|---|---|---|---|
|  |  | 1 | 2 | 3 | 4 |
| Storage time | [days] | 1 | 180 | 180 | 180 |
| Storage temperature | [° C.] | 20 | 20 | 30 | 40 |
| W/C |  | 0.42 | 0.42 | 0.42 | 0.42 |

-continued

| | Sample No. | | | |
|---|---|---|---|---|
| | 1 | 2 | 3 | 4 |
| Flow table [cm] | 16.5 | 18.0 | 17.0 | 18.0 |
| Initial setting [min.] | 500 | 450 | 400 | 330 |
| Final setting [min.] | 920 | 850 | 740 | 740 |

It can be seen that the properties are only slightly changed.

The invention claimed is:

1. A method of imparting flow to a cementitious composition, comprising the addition thereto of an admixture comprising:
   (1) 2-phosphonobutane-1,2,4-tricarboxylic acid;
   (2) optionally, citric acid or citric acid monohydrate; and
   (3) at least one polymer derived from ethylenically-unsaturated mono- or dicarboxylic acids, and characterised in that the polymer comprises:
   a) 51-95 mole % of moieties of formula 1a and/or 1b and/or 1c $$-CH_2-CR^1- \atop |\atop COX \qquad \text{Ia}$$

$$-CH_2-C- \atop |\atop CH_2 \atop |\atop COX \qquad \text{Ib}$$
with COX group above $$-CH_2-C\underset{O=C}{\overset{CH_2}{\diagdown}}\underset{Y}{\diagup}C=O \qquad \text{Ic}$$

wherein
   $R^1$=hydrogen or a $C_{1-20}$ aliphatic hydrocarbon residue;
   $X=O_aM$, $-O-(C_mH_{2m}O)_n-R^2$, $-NH-(C_mH_{2m}O)_n-R^2$,
   M=hydrogen, a mono- or divalent metal cation, an ammonium ion or an organic amine residue;
   a=0.5 or 1;
   $R^2$=hydrogen, $C_{1-20}$ aliphatic hydrocarbon, $C_{5-8}$ cycloaliphatic hydrocarbon or optionally substituted $C_{6-14}$ aryl residue;
   $Y=O, NR^2$;
   m=2-4; and
   n=0-200;
   b) 1-48.9 mole % of moieties of the general formula II $$-CH_2-CR^3- \atop |\atop (CH_2)_p-O-(C_mH_{2m}O)_n-R^2 \qquad \text{II}$$

wherein
   $R^3$=hydrogen or $C_{1-5}$ aliphatic hydrocarbon;
   p=0-3; and
   $R^2$ has the meaning given previously;

c) 0.1-5 mole % of moieties of Formulae IIIa or IIIb $$-CH-C- \atop |\ \ |\atop S\ \ T \atop \phantom{x}R^4 \text{above C} \qquad \text{IIIa}$$

$$-CH-CH-\ \ -CH-CH- \atop |\ \ \ \ \ \ \ \ \ \ \ \ |\ \ \ |\atop (CH_2)_z-V-(CH_2)_z \qquad \text{IIIb}$$
with $R^2$ on both CH wherein
   $S=H, -COO_aM, -COOR^5$ $$T = U^1-(CH-CH_2-O)_x-(CH_2-CH_2O)_yR^6 \atop \phantom{xxxxxx}|\atop \phantom{xxxxxx}CH^3$$

$-W-R^7$
   $-CO-[NH-(CH_2)_3]_s-W-R^7$
   $-CO-O-(CH_2)_z-W-R^7$
   $-(CH_2)_z-V-(CH_2)_z-CH=CH-R^2$
   $-COOR^5$ when S is $-COOR^5$ or $COO_aM$
   $U^1=-CO-NH-, -O-, -CH_2O-$
   $U^2=-NH-CO-, -O-, -OCH_2-$
   $V=-O-CO-C_6H_4-CO-O-$ or $-W-$ $$W = -\left(\underset{CH_3}{\overset{CH_3}{\text{Si}}}-O\right)_r-\underset{CH_3}{\overset{CH_3}{\text{Si}}}-$$

$R^4$=H, $CH_3$
   $R^5$=a $C_{3-20}$ aliphatic hydrocarbon residue, a $C_5$-$C_8$ cycloaliphatic hydrocarbon residue or a $C_{6-14}$ aryl residue;

$$R^6 = R^2,\ \ -CH_2-CH-U^2-C=CH \atop \phantom{xxxxxxxxx}|\ \ \ \ \ \ \ \ \ \ |\atop \phantom{xxxxxxxxx}R^4\ \ \ \ \ R^4\ S$$

$$R^7 = R^2,\ \ -[(CH_2)_3-NH]_s-CO-C=CH \atop \phantom{xxxxxxxxxxxxxxxxxxxxxx}|\ \ \ |\atop \phantom{xxxxxxxxxxxxxxxxxxxxxx}R^4\ S$$

$$-(CH_2)_z-O-CO-C=CH \atop \phantom{xxxxxxxxxxx}|\ \ \ |\atop \phantom{xxxxxxxxxxx}R^4\ S$$

wherein
   r=2-100
   s=1, 2
   z=0-4
   x=1-150
   y=0-15; and
   d) 0-47.9 mole % of moieties of the general formula IVa and/or IV b:

$$-CH-\ \ \ \ -CH- \atop |\ \ \ \ \ \ \ \ \ \ \ |\atop COO_aM\ \ COX \qquad \text{IVa}$$

-continued

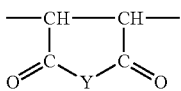

IVb wherein a, M, X and Y have the meanings defined above.

2. The method according to claim 1, in which:
a) the moiety is according to formula Ia;
   $R^1$, $R^2$ are independently H or $CH_3$;
   $X=O_aM$, $-O-(C_mH_{2m}O)_n-R^2$
   M=H or a mono- or divalent metal cation;
   a=1;
   Y=O, $NR^2$;
   m=2-3; and
   n=20-150;
b) $R^2$, $R^3$ are independently H or $CH_3$; and
   p=0-1; and
c) the moiety is according to formula IIIa;
   S=H, $-COO_aM$, $-COOR^5$

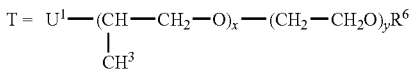

—CO—[NH—$(CH_2)_3]_s$—W—$R^7$
—CO—O—$(CH_2)_z$—W—$R^7$
$R^4$, $R^5$ are independently H, $CH_3$;

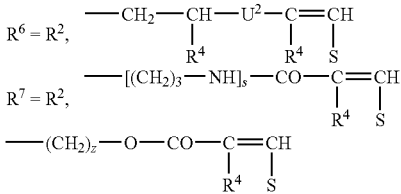

wherein
   $U^1$=—CO—NH—, —O—, —$CH_2$O—
   $U^2$=—NH—CO—, —O—, —$OCH_2$—
   x=20-50;
   y=1-10; and
   z=0-2.

3. The method according to claim 2, in which:
a) the moiety is according to formula Ia;
   $R^1$=H;
   $R^2$=$CH_3$;
   $X=O_aM$;
   M=a mono- or divalent metal cation;
   Y=O, $NR^2$;
   m=2; and
   n=25-50;
b) $R^2$, $R^3$=H; and
   p=0; and
c) the moiety is according to formula IIIa;
   S=H, $-COO_aM$;

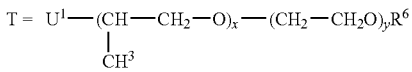

—CO—O—$(CH_2)_z$—W—$R^7$
$R^4$, $R^5$=H;

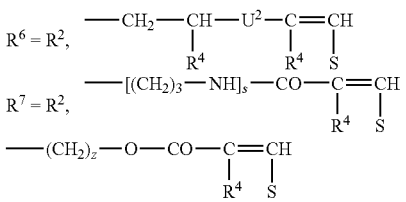

wherein
   $U^1$=—CO—NH—;
   $U^2$=—NH—CO—, —O—, —$OCH_2$—
   x=20-50;
   y=5-10; and
   z=1-2.

4. The method of claim 1 wherein the polymer has a weight-average molecular weight of from about 5,000 to about 50,000.

5. The method of claim 1 wherein the polymer has a weight-average molecular weight of from about 10,000 to about 40,000.

6. The method of claim 1 wherein the proportions of the solids of the three components are:
   Component 1—about 1% to about 40%;
   Component 2—0 to about 40%; and
   Component 3—about 5% to about 60%.

7. The method of claim 1 wherein the admixture is added at a rate of from about 0.2% to about 2% by weight solids of cement.

8. A method of spraying a cementitious composition comprising preparing a cementitious mix and conveying the mix to a spray nozzle, there being added to the mix at preparation an admixture comprising:
   (1) 2-phosphonobutane-1,2,4-tricarboxylic acid;
   (2) optionally, citric acid or citric acid monohydrate; and
   (3) at least one polymer derived from ethylenically-unsaturated mono- or dicarboxylic acids, and characterised in that the polymer comprises:
a) 51-95 mole % of moieties of formula 1a and/or 1b and/or 1c

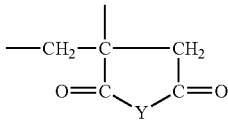

wherein
   $R^1$=hydrogen or a $C_{1-20}$ aliphatic hydrocarbon residue;
   $X=O_aM$, $-O-(C_mH_{2m}O)_n-R^2$, $-NH-(C_mH_{2m}O)_n-R^2$, M=hydrogen, a mono- or divalent metal cation, an ammonium ion or an organic amine residue;
a=0.5 or 1;
$R^2$=hydrogen, $C_{1-20}$ aliphatic hydrocarbon, $C_{5-8}$ cycloaliphatic hydrocarbon or optionally substituted $C_{6-14}$ aryl residue;
Y=O, $NR^2$;
m=2-4; and
n=0-200;
b) 1-48.9 mole % of moieties of the general formula II

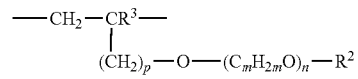

wherein
$R^3$=hydrogen or $C_{1-5}$ aliphatic hydrocarbon;
p=0-3; and
$R^2$ has the meaning given previously;
c) 0.1-5 mole % of moieties of Formulae IIIa or IIIb IIIa

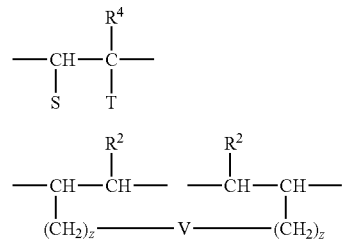

IIIb wherein
S=H, —$COO_aM$, —$COOR^5$ $T = U^1$—(CH—$CH_2$—O)$_x$—($CH_2$—$CH_2O$)$_y R^6$
         |
         $CH^3$ —W—$R^7$
—CO—[NH—$(CH_2)_3$]$_s$—W—$R^7$
—CO—O—$(CH_2)_z$—W—$R^7$
—$(CH_2)_z$—V—$(CH_2)_z$—CH=CH—$R^2$
—$COOR^5$ when S is —$COOR^5$ or $COO_aM$
$U^1$=—CO—NH—, —O—, —$CH_2O$—
$U^2$=—NH—CO—, —O—, —$OCH_2$—
V=—O—CO—$C_6H_4$—CO—O— or —W—

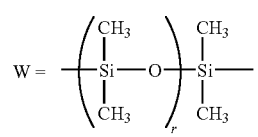

$R^4$=H, $CH_3$
$R^5$=a $C_{3-20}$ aliphatic hydrocarbon residue, a $C_5$-$C_8$ cycloaliphatic hydrocarbon residue or a $C_{6-14}$ aryl residue;

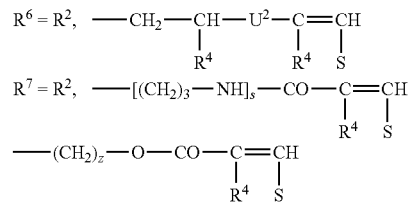

—$(CH_2)_z$—O—CO—C=CH
                    |   |
                    $R^4$ S wherein
r=2-100
s=1, 2
z=0-4
x=1-150
y=0-15; and
d) 0-47.9 mole % of moieties of the general formula IVa and/or IV b:

IVa

—CH——CH—
 |    |
$COO_aM$ COX

IVb

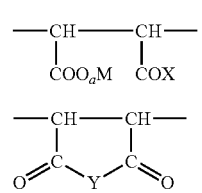

wherein a, M, X and Y have the meanings defined above.
9. The method according to claim 8, in which:
a) the moiety is according to formula Ia;
$R^1$, $R^2$ are independently H or $CH_3$;
X=$O_aM$, —O—($C_mH_{2m}O$)$_n$—$R^2$
M=H or a mono- or divalent metal cation;
a=1;
Y=O, $NR^2$;
m=2-3; and
n=20-150;
b) $R^2$, $R^3$ are independently H or $CH_3$; and
p=0-1; and
c) the moiety is according to formula IIIa;
S=H, —$COO_aM$, —$COOR^5$ $T = U^1$—(CH—$CH_2$—O)$_x$—($CH_2$—$CH_2O$)$_y R^6$
         |
         $CH^3$

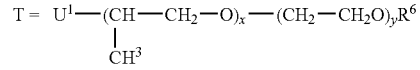
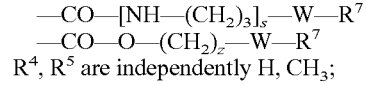
$R^4$, $R^5$ are independently H, $CH_3$;

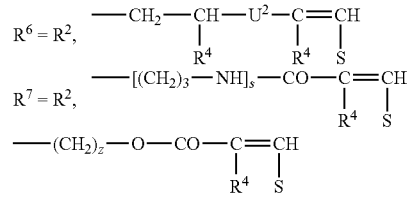

—$(CH_2)_z$—O—CO—C=CH
                    |   |
                    $R^4$ S wherein
$U^1$=—CO—NH—, —O—, —$CH_2O$—
$U^2$=—NH—CO—, —O—, —$OCH_2$—
x=20-50;

y=1-10; and
z=0-2.

10. The method according to claim 9, in which:
a) the moiety is according to formula Ia;
R$^1$=H;
R$^2$=CH$_3$;
X=O$_a$M;
M=a mono- or divalent metal cation;
Y=O, NR$^2$;
m=2; and
n=25-50;
b) R$^2$, R$^3$=H; and
p=0; and
c) the moiety is according to formula IIIa;
S=H, —COO$_a$M;

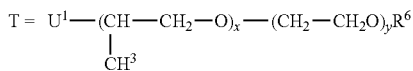

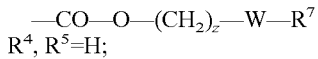

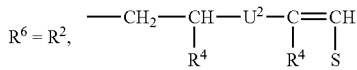

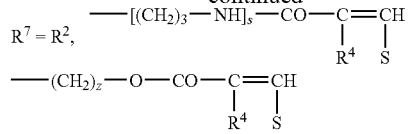

wherein
U$^1$=—CO—NH—;
U$^2$=—NH—CO—, —O—, —OCH$_2$—
x=20-50;
y=5-10; and
z=1-2.

11. The method of claim 8 wherein the polymer has a weight-average molecular weight of from about 5,000 to about 50,000.

12. The method of claim 8 wherein the polymer has a weight-average molecular weight of from about 10,000 to about 40,000.

13. The method of claim 8 wherein the proportions of the solids of the three components are:
Component 1—about 1% to about 40%;
Component 2—0 to about 40%; and
Component 3—about 5% to about 60%.

14. The method of claim 8 wherein the admixture is added at a rate of from about 0.2% to about 2% by weight solids of cement.

* * * * *